United States Patent
Farley

[15] 3,697,045
[45] Oct. 10, 1972

[54] ADJUSTABLE WINCH FOR CARGO TIE-DOWN

[72] Inventor: Holt A. Farley, Annandale, N.J.

[73] Assignee: American Aluminum Company, Mountainside, N.J.

[22] Filed: May 11, 1971

[21] Appl. No.: 142,176

[52] U.S. Cl. ............ 254/51, 105/368 T, 280/179 A, 248/361 A
[51] Int. Cl. ............................................. B66f 1/00
[58] Field of Search ............... 254/150, 186, 51, 164; 105/368 T, 369 A; 280/179 A; 248/361 A

[56] References Cited

UNITED STATES PATENTS

| 3,212,457 | 10/1965 | Looker | 105/369 A |
| 3,295,464 | 1/1967 | Broling | 105/369 A |
| 3,412,692 | 11/1968 | Evans | 248/361 A X |
| 3,426,996 | 2/1969 | Broling | 248/361 A |

Primary Examiner—Othell M. Simpson
Attorney—Harry B. Rook

[57] ABSTRACT

A U-shaped winch frame has a winding drum for a flexible tie-down element journaled in its arms which have notches in their opposite edges into which extend inwardly projecting flanges on a track which is fixedly secured to the body of a vehicle so that the winch can be freely slid along said track into different positions relative to the truck body and the cargo load thereon.

6 Claims, 8 Drawing Figures

PATENTED OCT 10 1972
3,697,045
SHEET 1 OF 2
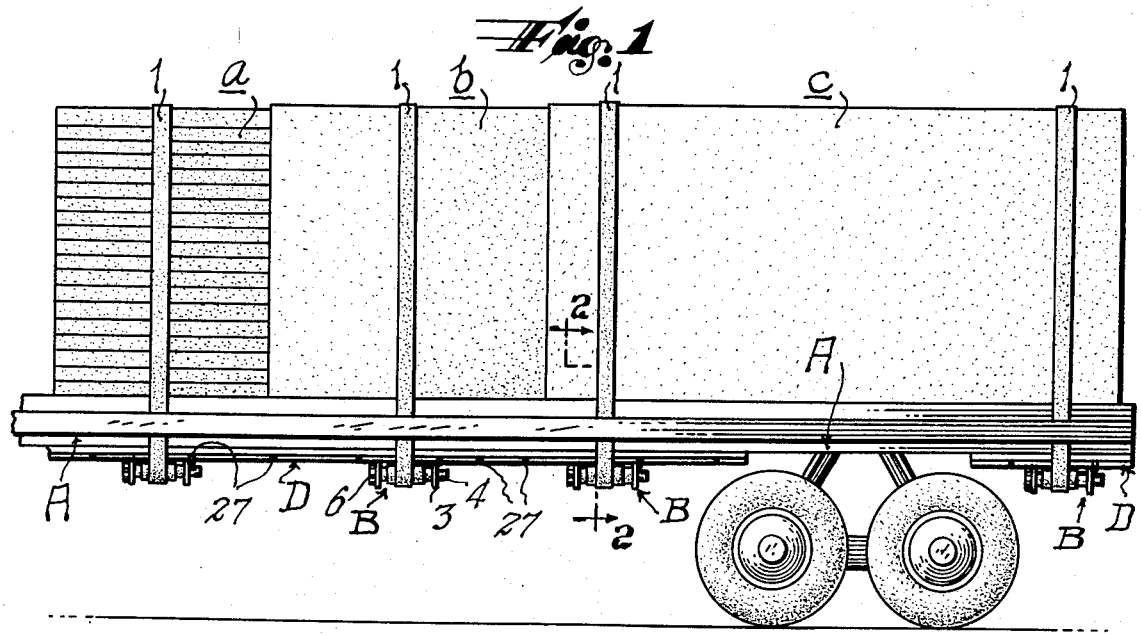
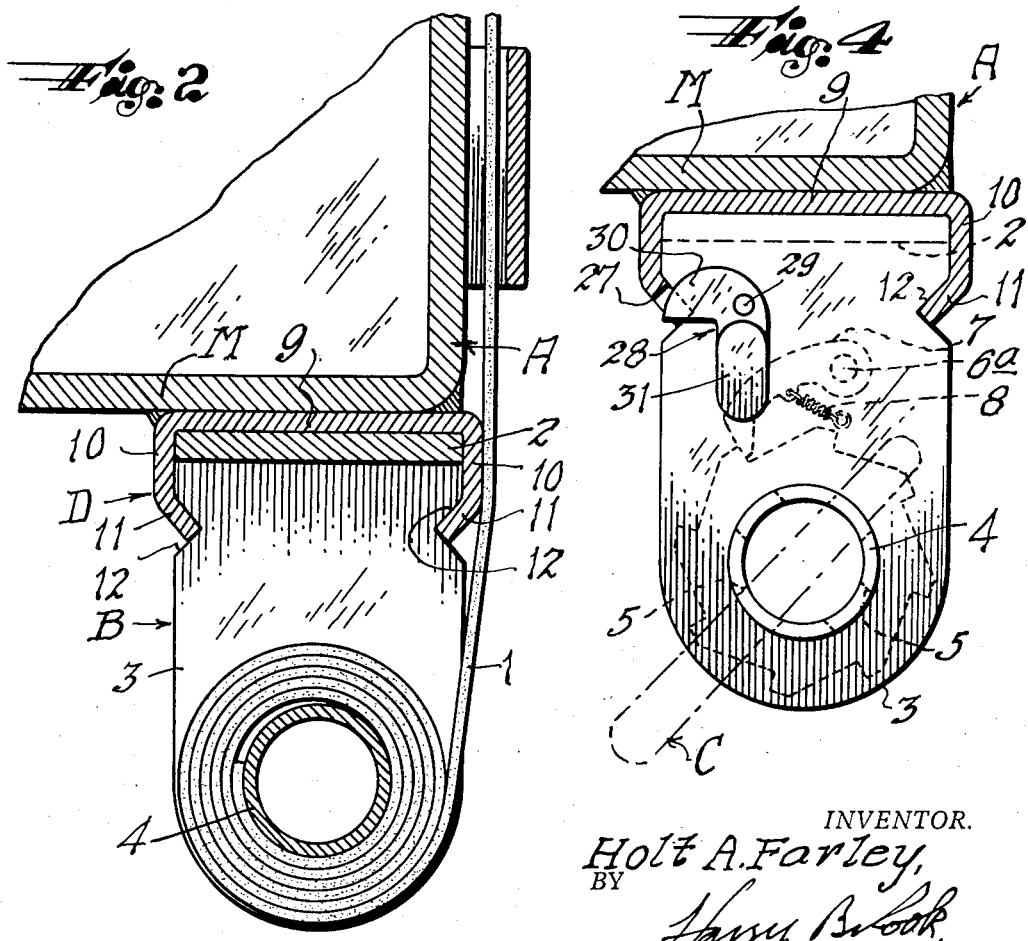
INVENTOR.
Holt A. Farley,
BY
Harry B. Cook,
ATTORNEY

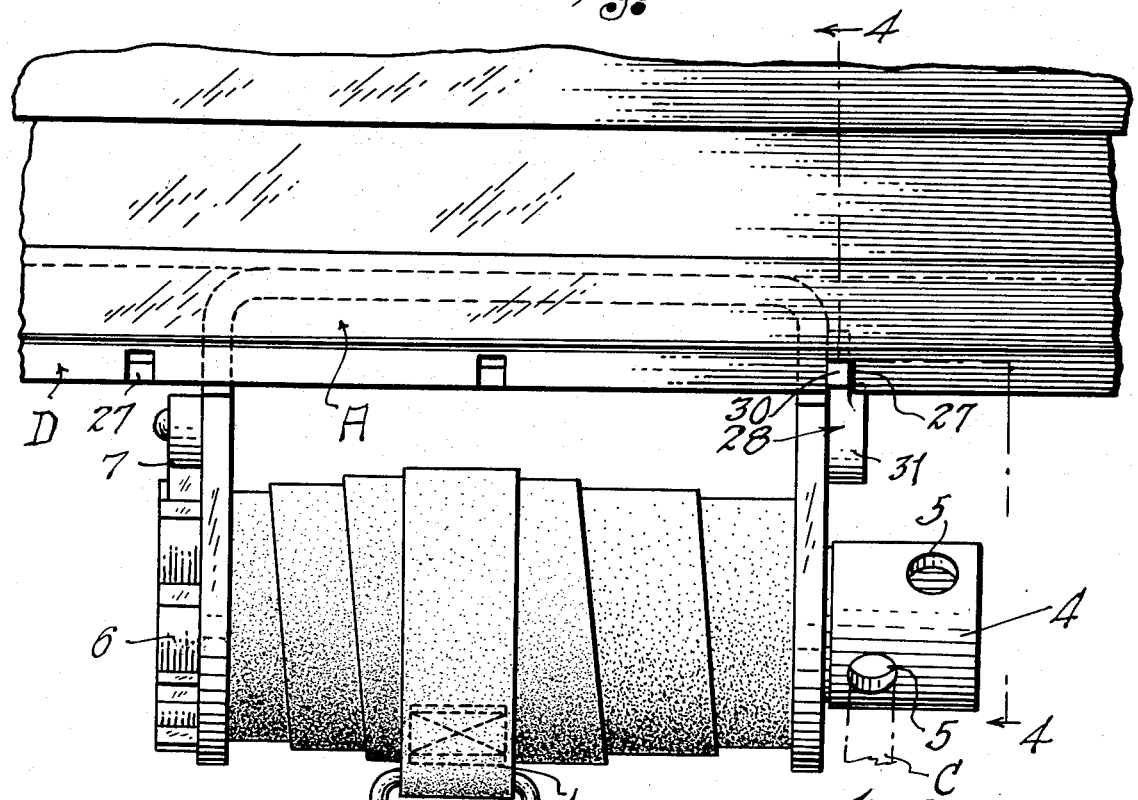
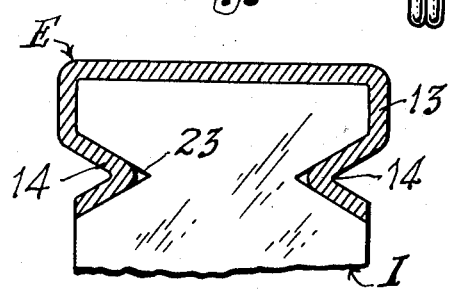
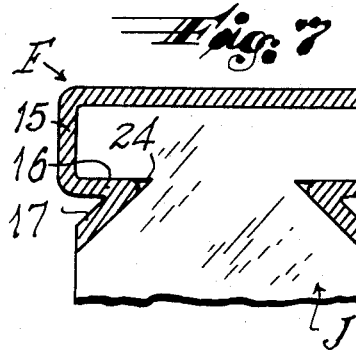
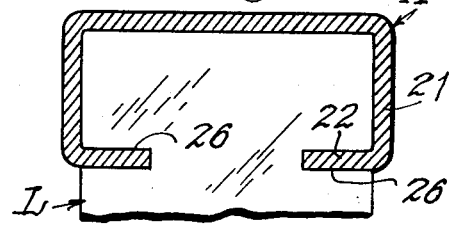
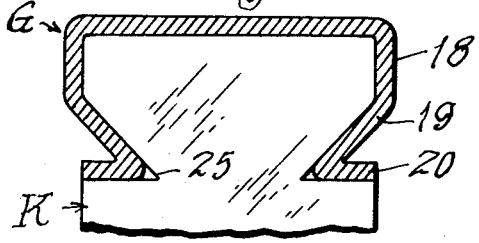
INVENTOR.
Holt A. Farley,
BY
ATTORNEY

ADJUSTABLE WINCH FOR CARGO TIE-DOWN

BACKGROUND OF THE INVENTION

1. Field of the Invention

The invention relates to cargo tie-down devices of the type which include a flexible tie-down element having its ends connected to a vehicle body and its intermediate portion drawn tightly over a load on said body. Hereinafter, the term "tie-down strap" will be used to include any form of flexible tie-down element, for example, strapping whether it be nylon webbing, steel webbing, cable or rope.

2. The Prior Art

The strap ends are connected either to a winch or to a stake which in some cases are mounted on the body for movement longitudinally thereof to accomodate the load.

The prior devices leave much to be desired in that either they comprise complicated and expensive constructions, or they are difficult to adjust, or they are not reliable in operation.

SUMMARY OF THE INVENTION

A primary object of the present invention is to provide novel and improved means for adjustably mounting a cargo winch on the body of a vehicle such as a motor truck or a railroad car, which overcomes the deficiencies of and objections to the prior devices and which is simple and inexpensive in construction, can be easily and quickly adjusted, and is reliable in operation.

The invention especially contemplates a novel and improved construction and combination of a winch frame and a track therefor secured on the vehicle body wherein the winch frame is U-shaped and has notches in opposite edges of its arms into which extend inwardly projecting flanges on a track which is secured on the vehicle body, so that the winch frame can freely slide longitudinally of the track and the vehicle body.

A BRIEF DESCRIPTION OF THE DRAWINGS

For a complete understanding of the invention, reference should be had to the following description in conjunction with the accompanying drawings in which:

FIG. 1 is a fragmentary side elevation of a motor truck trailer carrying a load secured by hold-down straps that are tightened by adjustable winches embodying the invention;

FIG. 2 is an enlarged fragmentary transverse vertical sectional view through a portion of the trailer body or deck and one of the adjustable winches;

FIG. 3 is an enlarged front elevation of one of the adjustable winches on the trailer body which is shown fragmentarily with the tie down strap wound on the winch drum in out-of-use position;

FIG. 4 is a fragmentary transverse vertical sectional view on the plane of the line 4—4 of FIG. 3;

FIG. 5 is a fragmentary transverse vertical sectional view through a modified form of the winch supporting rail with a portion of the winch frame illustrated in end elevation;

FIG. 6 is a similar view of another modification of the invention;

FIG. 7 is a like view of still another form of the rail and the winch frame, and FIG. 8 is a view like FIG. 7 showing another modification.

DESCRIPTION OF THE PREFERRED EMBODIMENTS

Specifically describing the invention, the reference character A designates an elongated substantially flat deck or floor of a transport vehicle, for example the trailer of a motor truck, which is shown as having a load thereon comprising different sections or portions *a*, *b* and *c*. In accordance with the general practice, the load is tied down or held against movement on the deck by tie-down straps 1 each of which has one end connected to, for example a stake or anchor ring secured to the deck at one side of the load, while the other end of the strap is wound or tightened at the other side of the load on a winch generally designated B.

In the present instance, the winch is shown as comprising a U-shaped frame mounted on a rail D on the vehicle deck and having a bottom or main portion 2 and spaced and parallel arms 3 between and in which is journalled a winch or winding drum 4 on which the strap is wound upon rotation of the drum in one direction. As shown, one end of the drum projects outwardly beyond one of the arms 3 and has a plurality of transverse openings 5 to receive a handle pin C for rotating the drum. Of course, other means may be utilized for rotating the drum to wind and unwind the strap thereon. To prevent accidental backward rotation of the drum, the other end of the drum has rigidly secured thereto a ratchet 6 with which cooperates pawl 7 pivoted at 6*a* on the arm 3 and normally yieldingly biased into engagement with the ratchet by a spring 8.

The invention is particularly concerned with the adjustable mounting of the winch on the vehicle deck or body so that a plurality of winches may be utilized and each adjusted to different positions longitudinally of the vehicle deck to accommodate the loads on the deck. As shown, one form of track is a metal channel which has a base web 3 rigidly secured to the deck, either on the bottom side or the top side thereof with the channel facing downwardly or upwardly, respectively, but preferably the channel is secured to the underside of the deck as shown, by any suitable means such as bolts or screws, or where the deck has a metal frame M as shown, preferably the base web of the channel is welded to the deck.

The channel rail D has spaced apart side flanges 10 which have longitudinal portions 11 projecting inwardly of the channel in opposed relation to each other, and the frame of each winch is slidably mounted in the rail between said flanges and has recesses 12 receiving the inwardly projecting portions 11 in slidable relation thereto as best shown in FIG. 2. Preferably the recesses 12 are in the form of V-shaped notches in the edges of the arms 3 of the winch frame.

However, the invention contemplates variations in the form of the rail D. For example, the inwardly projecting longitudinal portions of the side flanges of the rail may be in the form of corrugations as shown in FIGS. 5, 6 and 7. In FIG. 5 the side flanges 13 of the track E have longitudinal corrugations 14 that are V-shaped in cross-section, while the side flanges 15 of the channel F in FIG. 7 have corrugations portions 16 of which are perpendicular to the flanges, and the other portions 17 are diagonal. In effect the corrugations in the flanges 18 of the track G in FIG. 6 are the reverse of the corrugations in FIG. 6, comprising diagonal intermediate portions 19 and terminal portions 20 perpendicular to the planes of the flanges.

In FIG. 8 the side flanges 21 of the track H have their edge portions turned inwardly at right angles to the flanges as indicated at 22.

It will be understood that in the various forms of the invention the notches 23, 24, 25 and 26 in the respective winch frames will correspond to the shape of the inwardly projecting longitudinal portions as shown in the tracks E, F, G and H, respectively. In FIGS. 5, 6, 7 and 8, the winch frames are shown fragmentarily in end elevation and designated respectively I, K, J and L.

The invention also contemplates means for temporarily holding the winch frames in their adjusted positions. For this purpose the invention contemplates a plurality of notches 27 in the edge portion of one of the side flanges of the rail and spaced apart longitudinally of the rail; and selectively cooperating with the notches is a dog 28 pivotally mounted intermediate its ends 29 on each winch frame. Each dog has a head portion 30 to move into and out of the notches, and a combined handle-counter weight portion 31 for manual manipulation of the latch. Normally the head portions of the latches are held out of the notches by engagement with the edge of the flange as the winch flange is slid along the frame, and when the pawl reaches a notch, the head thereof is automatically swung into the notch by the counter weight 31 to hold the winch against further movement longitudinally of the rail. To release the winch, the handle 31 of the dog can be manually gripped to swing the head 30 out of the notch.

While the now preferred embodiments of the invention have been shown and described, it should be understood that this is primarily for the purpose of illustrating the principles of the invention and that the construction of the adjustable winch may be modified and changed within the spirit of the invention and scope of the appended claims.

I claim:

1. In a cargo tie-down apparatus for a transport vehicle, a channel-shaped rail adapted to be secured to the deck of the vehicle and comprising a base web and spaced apart side flanges having longitudinal portions projecting inwardly of the channel, and a winch including a frame and a winding drum journaled therein, said frame having recesses and being held within said rail for adjustable sliding longitudinally thereof by engagement of said inwardly projecting portions of the channel flanges with said recesses.

2. In a cargo tie-down apparatus as defined in claim 1, said winch frame being U-shaped and comprising a base portion slidable within the rail and two spaced and parallel arms projecting out of the rail between said side flanges and in which said drum is journaled, and said recesses being formed in said arms.

3. In a cargo tie-down apparatus as defined in claim 2, said recesses being notches in the edges of said arms.

4. In a cargo tie-down apparatus as defined in claim 2, said recesses being V-shaped notches in the edges of said arms, and said longitudinal inwardly projecting portions of said side flanges of the rail being corrugations in the flanges.

5. In a cargo tie-down apparatus as defined in claim 1, the addition of notches spaced apart longitudinally of the edge of at least one of said side flanges, and a latch pivoted on said winch frame and normally urged into but manually displaceable from said notches selectively to hold and release the frame in adjusted position, respectively.

6. In a cargo tie-down apparatus as defined in claim 1, said latch pivoted between its ends, one end is a nose to engage said notches and the other end is a combined counterweight and finger piece.

* * * * *